May 22, 1956 U. B. BRAY 2,746,980
PRODUCTION OF MAHOGANY SULFONATES
Filed Oct. 27, 1952
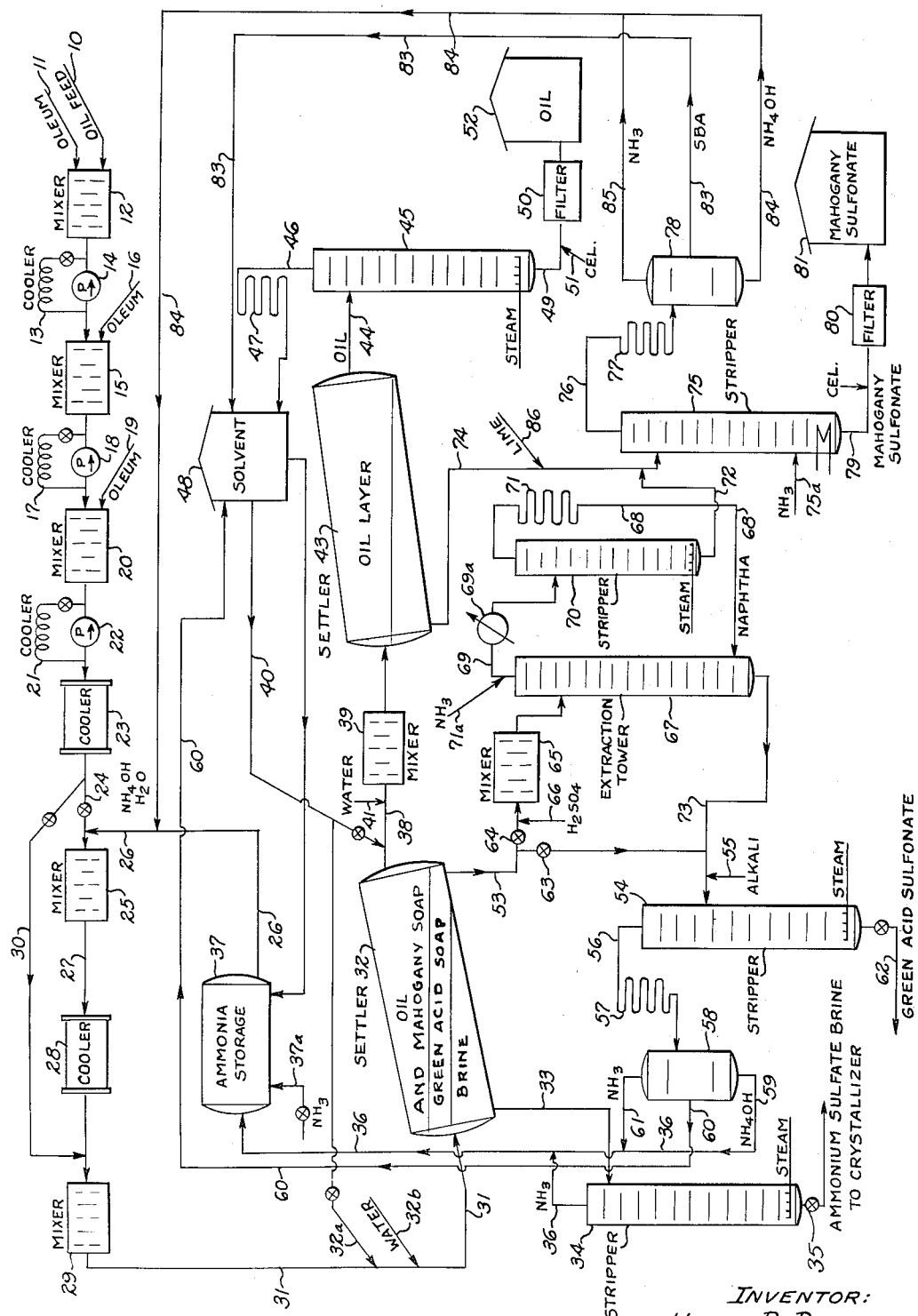
INVENTOR:
ULRIC B. BRAY
by Vanderveer Voorhees Atty.

United States Patent Office 2,746,980
Patented May 22, 1956

2,746,980

PRODUCTION OF MAHOGANY SULFONATES

Ulric B. Bray, Pasadena, Calif., assignor, by mesne assignments, to Bray Oil Company, Los Angeles, Calif., a limited partnership Application October 27, 1952, Serial No. 317,098

8 Claims. (Cl. 260—429.9)

This invention relates to a process of making sulfonates from petroleum hydrocarbons. More particularly, it relates to a process of sulfonating hydrocarbons followed by neutralization of the sulfonation products and conversion of the products into various useful materials. The invention is illustrated by a drawing that shows diagrammatically an apparatus for carrying out the process.

One object of the invention is to convert all products of sulfonation of petroleum oils into useful materials. Another object of the invention is to avoid the handling of corrosive by-products from sulfonation. Still another object of the invention is to avoid the use of expensive, caustic alkali in manufacturing polyvalent metal sulfonates.

Heretofore, it has been the practice in manufacturing polyvalent metal sulfonates, such as calcium and barium sulfonates, to first prepare sodium sulfonate and subsequently convert it into the desired oil soluble calcium or barium sulfonate, generally by treatment with the corresponding chloride. This process has suffered from the difficulty of effecting a clean conversion of the sodium sulfonate to the polyvalent metal sulfonate and it has generally been necessary to employ an excess of the polyvalent metal salt. Furthermore, the product from the conversion reaction has usually been contaminated with chlorides which are highly objectionable for certain uses of the polyvalent metal sulfonate on account of their corrosive nature.

According to this invention, the products of sulfonation are converted entirely to ammonium salts by treatment with ammonium hydroxide. The ammonium salts are then separated into various fractions and converted, when desired, into salts of various metals such as the alkaline earth metals, calcium, strontium, and barium. They are also readily converted to sulfonates of sodium, potassium, lithium, magnesium, aluminum, zinc, lead, copper, etc. Unreacted sulfuric acid is converted to ammonium sulfate which is a valuable product of the process. I prefer to separate the ammonium sulfonate into a preferentially oil soluble and a preferentially water soluble fraction before conversion to metal sulfonates.

Referring to the drawing, mineral oil and oleum are fed by lines 10 and 11 respectively, to mixer 12, where they are intimately contacted in the first stage of the sulfonation reaction. The oil is usually a lubricating oil fraction from petroleum, having a viscosity of about 100 to 900 seconds Saybolt at 100° F. usually about 200–400 sec. Saybolt. Oils of an aromatic nature have been found to give higher yields of sulfonates and I may use advantageously, the solvent extracts from lubricating oils. I may also use aromatic alkylates of 25 to 60 carbon atoms. In most cases the oil should be given a preliminary treatment with sulfuric acid, e. g.: 85 to 95% acid, $AlCl_3$, $BF_3$, fuller's earth, etc. to remove from it the readily polymerizable substances, unsaturates, etc. which produce colored bodies and resins on contact with oleum. The oleum employed is the usual article of commerce such as 104% or 120% oleum. In the first stage of sulfonation in mixer 12, the amount of oleum introduced is suitably about ½ to 1½ pounds per gallon of oil charged.

The reaction which is initiated in mixer 12 continues as the mixture flows through cooler 13 where the heat of reaction is prevented from exceeding about 140° F. and a temperature of about 120–130° F. is preferred. The sulfonation reaction is largely controlled by recycling the reaction mixture through pump 14 back to cooler 13. A portion of the stream flows continuously into mixer 15 where it is treated with an additional charge of oleum introduced by line 16 and the reaction is continued to cooler 17 with recycle oil from pump 18. Two stages of sulfonation may be sufficient but if desired, a third stage may be employed, additional oleum being added by line 19 to mixer 20. The reaction product from mixer 20 is recycled through cooling coil 21 and pump 22. Pumps 14, 18 and 22, preferably of the centrifugal type, provide rapid flow against low back pressure and also provide intimate mixing of the acid and the oil. The amount of oleum introduced by each of lines 11, 16 and 19 can be about ½ lb. to 1 lb. per gallon of oil treated except in the case of oils which are highly aromatic such as solvent extracts of lubricating oils, aromatic alkylates, etc., in which case the amount of oleum may equal or exceed the weight of oil treated. It can be regulated by closely observing the temperature rise which I prefer to hold constant, for example at about 25 to 40° F. If desired, part of the sludge produced in any or all intermediate treating stages may be removed at each stage by settling or centrifuging.

From the last sulfonation stage, the acid oil flows through cooler 23 where its temperature is reduced below about 100° F. A portion of the product from cooler 23 flows by line 24 to mixer 25 where it is contacted with an excess of ammonium hydroxide and water. The mixture flows by line 27 through cooler 28 to absorb the heat of neutralization and thence to mixer 29 where it is mixed with an additional portion of the acid oil conducted from cooler 23 by line 30. The temperature should be held below about 160° F. to prevent discoloration and a temperature of 125–140° F. is preferred. It is desirable to maintain an excess of ammonia throughout the neutralizing system to avoid corrosion which would result from the action of diluted sulfuric and sulfonic acids on steel equipment. Accordingly, it is not necessary to employ acid resistant equipment excepting at the point of mixing the acid oil with the aqueous ammonia. By maintaining an excess of ammonia, I also prevent formation of undesirable sulfonamides which form when ammonia is added to the strong sulfuric and sulfonic acid mixtures.

Other means for effecting neutralization of the acid reaction product with ammonia can be employed. Thus, I may spray the acid reaction product in the form of a mist or fine droplets into a neutralizing chamber into which gaseous ammonia is introduced. The atmosphere of gaseous ammonia instantly neutralizes the particles of acid oil and sludge from the final sulfonation stage and the heat generated by the neutralization reaction can be controlled by the introduction of a water spray to maintain the temperature within a range of about 150–225° F.

From mixer 29, the neutralized product containing ammonium sulfonates is passed by line 31 to settler 32. Additional water may be added by line 32b to dissolve any ammonium sulfate which may separate, forming a hot saturated solution containing about 40–50% of $(NH_4)_2SO_4$, which separates as a brine layer in the bottom of settler 32.

Simultaneously, there is added to the mixture by line 32a, a suitable separating solvent, preferably an alcohol having from 4 to 6 carbon atoms, butyl, amyl or hexyl alcohol. The solvent is a mutual solvent for oil and water. I prefer for this purpose, sec. butyl alcohol which boils at about 210° F. and which is therefore readily recovered by distillation from the sulfonate and oil mixture at a later step in the process. The sec. butyl alcohol forms a constant boiling mixture with water, containing about 68% alcohol boiling at about 195° F. It is convenient to use this mixture in all commercial process operations. Separating solvent is added to extract from the product the preferentially water soluble sulfonates in the form of their ammonium salts. These sulfonates are commonly known as green acid sulfonates. The amount of alcohol required for this purpose is about 5–50 parts to 100 parts of oil and sulfonate depending on the characteristics of the hydrocarbon oil treated and the extent of sulfonation which has been effected. The green acid soap in butyl alcohol and water forms an intermediate layer in settler 32 with an upper layer consisting mainly of ammonium mahogany sulfonate dissolved in the oil.

The lower layer is withdrawn from the settler by line 33, heated and flashed in stripper 34 to recover excess ammonia and solvent and then conducted by line 35 to an evaporator or crystallizer not shown, to recover the ammonium sulfate as a crystalline solid product. Evaporation is economically carried out in a spray dryer. The product may be further purified by recrystallization but is usually sufficiently pure for use as a fertilizer. The liberated ammonia from stripper 34 is conducted by line 36 to ammonia storage reservoir 37.

The upper oil phase from settler 32 is withdrawn by line 38 to mixer 39 where it is intimately contacted with additional separating solvent introduced by line 40. For this purpose, I add additional solvent and water by lines 40 and 41 respectively. For simplicity, the same solvent is added in settler 32, for example, sec. butyl alcohol. Other solvents such as normal, tertiary or isobutyl alcohol, amyl alcohol or pentasol may be employed in the process but are generally less convenient and economical. The amount of separating solvent added is usually about 10 to 50 parts by volume per 100 parts of the oil phase withdrawn from 32 and the temperature is conveniently about 120° F. to 180° F. The amount of water necessary in the separation stage is generally about ½ to 3 volumes per volume of alcohol added. The mixture of water, oil, sulfonate and solvent from mixer 39 is transferred by line 42 to settler 43, where it separates into an oil phase substantially free of sulfonates and a lower aqueous phase containing most of the ammonium salts of the oil soluble sulfonic acids dissolved in solvent and water.

Unsulfonated oil, sometimes called "by-product oil" is withdrawn from separator 43 by line 44 leading to stripper 45 where it is stripped to remove dissolved ammonia and solvent vapors which are conducted by line 46 to condenser 47 and thence to solvent storage tank 48.

The unsulfonated oil from stripper 45 is conducted by line 49 to filter 50 where it is filtered bright in the presence of a suitable filter aid such as Supercel introduced by line 51. The filtered oil then flows to storage tank 52 from which it may be withdrawn for use as a motor oil, for blending and for other purposes to which a highly refined lubricating oil is adapted.

Returning to settler 32, the dark colored intermediate layer consisting essentially of the ammonium salts of preferentially water soluble sulfonic acids or so-called "green acids" are conducted by line 53 to stripper 54. Sodium hydroxide solution, lime or other suitable base is introduced by line 55 to convert the ammonium sulfonate to the corresponding sodium, calcium or other desired metal sulfonate. The liberated ammonia and solvent vapors are withdrawn from stripper 54 by line 56 leading to condenser 57 and receiver 58. The aqueous phase separated in receiver 58 is conducted by lines 59 and 36 to storage tank 37. The solvent phase separated in 58 is conducted by line 60 to the solvent supply line 40. Any uncondensed ammonia vapors are returned to the system by line 61. If desired to produce ammonium green acid sulfonates, introduction of bases by line 55 is omitted.

The sulfonate products from stripper 54 are withdrawn by line 62 and may be used as detergents, wetitng agents, emulsifying agents or for numerous purposes requiring a low cost surface active, water soluble material. If desired they may be further purified by extracting them with petroleum naphtha, hexane, butane, etc. to remove oil soluble contaminants. This extraction is preferably carried out on the green acids resulting from acidifying the soaps in line 62. The resulting purified acids can be neutralized with caustic soda or other alkali to reconstitute the desired purified soap.

When desired to recover oil soluble acids from the ammonium soap layer withdrawn by line 53, I may divert the stream by closing valve 63 and opening valve 64 leading to mixer 65. A stream of acid, for example sulfuric acid, is introduced by line 66 in sufficient amount to acidify the mixture, for example, to a hydrogen ion concentration of about pH=2.

From mixer 65, the acids pass to extraction tower 67 where they are extracted countercurrently with a stream of naphtha, hexane, butane or similar paraffinic solvent introduced by line 68. The extract flows by line 69 through heater 69a to stripper 70 where the solvent is removed, condensed in condenser 71 and thence recycled to the extractor. The sulfonic acid extract is withdrawn by line 72. The extracted water soluble sulfonic acids pass by line 73 to stripper 54, sufficient caustic soda or other suitable alkali being introduced through line 55 to convert the sulfonic acids into any desired soap which is withdrawn from the system by line 62. Ammonium sulfate is converted at the same time to sodium sulfate which is frequently useful in the green acid soap as a "builder."

The oil soluble ammonium mahogany sulfonate layer containing some ammonium sulfate and butyl alcohol separated in settling chamber 43 is withdrawn by line 74 leading to stripper 75 where alcohol, water and excess ammonia are removed by vapor line 76 condensed in coil 77 and collected in receiver 78. The temperature in stripper 75 is controlled to prevent excessive temperatures which would cause decomposition of the ammonium sulfonate product. It is desirable to operate at temperatures below about 250° F. although temperatures of 350° F. may be employed for short intervals. Development of acidity in the sulfonate in stripper 75 can be avoided by introducing ammonia gas by line 75a, the ammonia gas simultaneously aiding in stripping water from the sulfonate stock. The mahogany sulfonate is withdrawn by line 79, clarified in filter 80 and collected in storage tank 81. Clarification can be facilitated by adding a filtering earth by line 82.

The solvent alcohol layer collected in receiver 78 is conducted by line 83 to solvent storage tank 48. Aqueous ammonia in the bottom of receiver 78 and ammonia vapors in the top of the receiver are conducted by lines 84 and 85 respectively to the acid oil stream in mixer 25 as previously described.

When desired to convert the ammonium sulfonate to calcium, barium, lithium or sodium sulfonate for example, the corresponding metal oxide or hydroxide is introduced into the sulfonate stream by line 86 before it enters the stripper 75. Reclaimed sulfonic acids in line 72 can also be neutralized by the added metal oxide or hydroxide. Double decomposition results in the separation of ammonia gas which is recovered and used again in the system as previously described.

It will be observed that my process provides a high degree of flexibility in the manufacture of sulfonic soaps. Any desired soap can be produced, either of the preferentially oil soluble type or the preferentially water soluble type. Neutralization of the excess sulfuric acid with ammonia disposes of a troublesome acid sludge waste which is encountered in the usual sulfonation processes. Complete neutralization of the sulfonation mixtures also eliminates the necessity for acid resisting equipment for handling corrosive acid oil and sludge. By my process, it is therefore possible to immediately quench the sulfonation reaction after the desired sulfonation has taken place which is usually within a few seconds or minutes, e. g. 10 seconds to 5 minutes after mixing with the final portion of oleum. Rapid quenching of the sulfonation mixture with ammonia, prevents undesirable side reactions, over-sulfonation and formation of undesirable color bodies particularly in the sludge layer. The resulting green acid sulfonates are consequently of better color than previously prepared products of this character.

The mahogany sulfonate product in tank 81 may contain about 25 to 50% of hydrocarbon lubricating oil. Where it is desirable to increase the amount of oil or control it accurately, a portion of the oil from tank 52 can be blended with the mahogany sulfonate in tank 11.

Having thus described my invention, what I claim is:

1. The process of making mahogany sulfonates which comprises sulfonating a hydrocarbon oil having a viscosity upwards of about 100 seconds Saybolt at 100° F. with sulfuric acid, then immediately without separation of sludge, neutralizing the reaction product with ammonia, thereby forming ammonium sulfate and sulfonates, separating the neutralized product in the presence of water and a mutual solvent into an oil phase, an aqueous phase and an intermediate phase, recovering preferentially water soluble sulfonates from the intermediate phase and recovering preferentially oil soluble mahogany sulfonates from the said oil phase.

2. The process of claim 1, wherein the preferentially water soluble sulfonate phase is treated with a metal hydroxide and subjected to stripping for removal of liberated ammonia and the liberated ammonia is recycled to the neutralizing step.

3. The process of claim 1, wherein the said separated oil phase is extracted with water and an alcohol having 4 to 6 carbon atoms, the extracted oil is stripped to remove alcohol which is recycled in the extraction operation and the alcohol extract containing ammonium sulfonates of the preferentially oil soluble type is stripped of alcohol which is recycled to the extraction step of the process.

4. The process according to claim 1 wherein separated ammonium mahogany sulfonate is converted to a metal sulfonate by heating with the hydroxide of the said metal, thereby liberating ammonia gas, and the liberated ammonia is recycled to the said neutralizing operation.

5. The process of making a metal mahogany sulfonate with any desired metal substantially free of corrosive halogen salts which comprises sulfonating a hydrocarbon oil having a viscosity upwards of about 100 seconds Saybolt at 100° F., immediately quenching the reaction mixture with aqueous ammonium hydroxide sufficient to neutralize all the sulfuric and sulfonic acids in the mixture, separating from the neutralized product an oil phase containing dissolved ammonium mahogany sulfonate, extracting the ammonium mahogany sulfonate from the oil phase with water and an organic solvent for said ammonium mahogany sulfonate which can be removed by distillation at a temperature below the decomposition temperature of mahogany sulfonate, converting the ammonium mahogany sulfonate into the desired metal sulfonate by mixing the solvent extract with a compound selected from the class consisting of oxides and hydroxides of the corresponding metal, heating the resulting mixture to complete the conversion and liberate ammonia, stripping the resulting metal sulfonate free of solvent and ammonia and recycling said solvent and said ammonia in the process.

6. The process of making polyvalent metal mahogany sulfonates substantially free of corrosive halogen salts and green acid sulfonates which comprises sulfonating hydrocarbon lubricating oil with fuming sulfuric acid at a temperature in the range of about 120° F. to 140° F., immediately neutralizing the entire sulfonation product with aqueous ammonium hydroxide in the presence of sufficient water to product a hot, substantially saturated solution of ammonium sulfate from the unreacted sulfuric acid, separating from the reaction product an oil phase containing oil soluble ammonium sulfonate, converting said ammonium sulfonate in said oil phase to polyvalent metal sulfonate by mixing with a polyvalent metal compound selected from the class consisting of oxides and hydroxides, thereby liberating ammonia and returning the liberated ammonia from the conversion step to the neutralizing step of the process.

7. The process of claim 6, wherein the ammonium sulfonate in said oil phase is concentrated before the conversion step by extraction with water and an alcohol having from 4 to 6 carbon atoms.

8. The process of making ammonium mahogany sulfonate which comprises sulfonating a hydrocarbon oil, thereby producing a mixture of preferentially oil soluble mahogany sulfonic acid, preferentially water soluble green sulfonic acid, sulfuric and sulfurous acids, immediately neutralizing the entire sulfonation product with ammonia, thereby producing ammonium mahogany sulfonates, ammonium green acid sulfonates, and water soluble ammonium sulfate and sulfite in a major proportion of said hydrocarbon oil, forming a mixture consisting essentially of said hydrocarbon oil, said ammonium mahogany sulfonates, said ammonium green acid sulfonates, said water soluble ammonium sulfate and sulfite, at least 5 parts by volume of water and at least 10 parts by volume of a hydrocarbon oil soluble emulsion breaking liquid per 100 parts by volume of said hydrocarbon oil and sulfonates, said emulsion breaking liquid being selected from the group consisting of butyl, amyl and hexyl alcohols, the amounts of said water and said emulsion breaking liquid being sufficient to produce three separable phases, a concentrated mahogany sulfonate phase containing hydrocarbon oil, water and emulsion breaking liquid; a hydrocarbon oil phase rejected from said concentrated mahogany sulfonate phase and an aqueous phase containing ammonium green acid sulfonates, and water soluble ammonium sulfate and sulfite, and separating said three phases from each other.

References Cited in the file of this patent

UNITED STATES PATENTS

| Number | Name | Date |
|---|---|---|
| 2,187,883 | Lemmon | Jan. 23, 1940 |
| 2,223,194 | Thompson | Nov. 26, 1940 |
| 2,307,953 | Potter | Jan. 12, 1943 |
| 2,414,773 | Showalter | Jan. 21, 1947 |
| 2,451,549 | Gzemski | Oct. 19, 1948 |
| 2,453,690 | Bray | Nov. 16, 1948 |
| 2,487,080 | Swenson | Nov. 8, 1949 |
| 2,509,863 | Harlan | May 30, 1950 |
| 2,556,256 | Cone et al. | June 12, 1951 |
| 2,559,439 | Jones et al. | July 3, 1951 |
| 2,650,198 | Kronig et al. | Aug. 25, 1953 |